United States Patent
Chuang

(10) Patent No.: US 7,127,965 B2
(45) Date of Patent: Oct. 31, 2006

(54) GRIP/MIRROR COMBINATION FOR BICYCLE

(76) Inventor: Louis Chuang, 7F-8, No. 20, Ta Lon Road, Taichung (TW)

(*) Notice: Subject to any disclaimer, the term of this patent is extended or adjusted under 35 U.S.C. 154(b) by 0 days.

(21) Appl. No.: 10/102,657

(22) Filed: Mar. 21, 2002

(65) Prior Publication Data
US 2003/0177857 A1 Sep. 25, 2003

(51) Int. Cl.
B62K 21/12 (2006.01)
G02B 5/08 (2006.01)
G02B 7/18 (2006.01)

(52) U.S. Cl. .................. 74/551.8; 359/842; 74/551.1

(58) Field of Classification Search ............ 74/551.8, 74/551.1; 359/842, 838, 871, 855, 857, 865, 359/881; 224/414; B26J 29/00
See application file for complete search history.

(56) References Cited

U.S. PATENT DOCUMENTS

| | | | | |
|---|---|---|---|---|
| 1,982,248 A | * | 11/1934 | Gebhardt | 132/296 |
| 3,981,567 A | * | 9/1976 | Cululi et al. | 359/842 |
| 4,054,375 A | * | 10/1977 | Ribeca | 359/842 |
| 4,135,788 A | * | 1/1979 | Sargis | 359/842 |
| 4,380,369 A | * | 4/1983 | Schacht | 359/842 |
| 4,433,899 A | * | 2/1984 | Sellet et al. | 359/842 |
| 4,826,306 A | * | 5/1989 | Grissen et al. | 359/842 |
| 5,148,327 A | * | 9/1992 | Gaxiola, Jr. | 359/855 |
| 5,522,527 A | * | 6/1996 | Tsai | 224/414 |
| 6,634,758 B1 | * | 10/2003 | Preis et al. | 359/842 |
| 2003/0072093 A1 | * | 4/2003 | Preis et al. | 359/842 |

FOREIGN PATENT DOCUMENTS

| | | | | |
|---|---|---|---|---|
| CH | 653 599 | * | 1/1986 | |
| DE | 3923706 A1 | * | 1/1991 | 74/551.8 |
| DE | 102 14 147 A1 | * | 11/2003 | 74/551.8 |
| EP | 000765798 A2 | * | 4/1997 | 74/551.8 |
| EP | 000936135 A2 | * | 8/1999 | 74/551.8 |
| EP | 001464570 A1 | * | 10/2004 | 74/551.8 |
| FR | 2 707 243 | * | 1/1995 | 74/551.8 |
| JP | 8-207857 | * | 8/1996 | |
| JP | 9-164983 | * | 6/1997 | |
| JP | 2001-10575 | * | 1/2001 | 74/551.8 |
| WO | WO 2004/018282 A1 | * | 3/2004 | 74/551.8 |

* cited by examiner

Primary Examiner—Vinh T. Luong
(74) Attorney, Agent, or Firm—Alan D. Kamrath; Nikolai & Mersereau, P.A.

(57) ABSTRACT

A grip/mirror combination includes an auxiliary grip and a mirror device. The auxiliary grip can be mounted on a bicycle handle so that a rider can hold the auxiliary grips while riding the bicycle. While riding the bicycle, the rider can extend the mirror device from the auxiliary grip in order to provide a clear view of vehicles beside and behind him. When the bicycle is parked, the mirror device can be concealed in the auxiliary grip, thus protecting the mirror device from being hit by any vehicle passing by it.

21 Claims, 14 Drawing Sheets

GRIP/MIRROR COMBINATION FOR BICYCLE

BACKGROUND OF INVENTION

1. Field of Invention

The present invention is related to a grip/mirror combination for a bicycle.

2. Related Prior Art

Bicycles used to be important traffic tools. Even now, there are still many people using bicycles for transportation, exercise or fun. Some riders ride their bicycles in parks or stadiums; however, most riders ride their bicycles on the road. While riding on the road, a rider has to pay attention to vehicles beside and behind him. A side view mirror is useful in helping a rider observe vehicles beside and behind him. In a long journey, a rider needs an auxiliary grip to help him relax his muscles so that he can last longer.

FIG. 13 shows two conventional auxiliary grips 1 each attached to a free end of a grip 2 mounted on a handle of a bicycle. The grips 2 provide a single function for a rider to hold on to. However, when the grips 2 are attached to the handle, side view mirrors cannot be mounted on the handle.

FIG. 14 shows a conventional bicycle handle equipped with two conventional grips 2 and two conventional side view mirrors 3. Due to their positions, the side view mirrors 3 can only provide a rider with a clear view for vehicles behind the bicycle, not a clear view for vehicles approaching the sides of the bicycle.

FIG. 15 shows a conventional handle equipped with two conventional grips 2 and two conventional side view mirrors 4. Due to their positions, the side view mirrors 4 can only provide a rider with a clear view for vehicles approaching the sides of the bicycle, not a clear view for vehicles behind bicycle. Moreover, when the bicycle is parked, the side view mirrors 4 may easily be hit and therefore broken.

Therefore, the present invention is intended to obviate or at least alleviate the drawbacks encountered in the art.

SUMMARY OF INVENTION

It is an objective of the present invention to provide a bicycle handle with a combination of an auxiliary grip with a mirror device in order to provide a clear view to a rider while riding.

It is another objective of the present invention to provide a bicycle handle with a combination of an auxiliary grip with a mirror device that can be concealed in the auxiliary grip when not in use.

The mirror device includes a cover pivotally connected with the auxiliary grip and a mirror mounted on the cover.

In an aspect of the present invention, the mirror device includes a second mirror mounted on a frame connected with the cover so that the second mirror can be pivoted relative to the first mirror between an extended position where they are substantially in a same plane and a concealed position where they face each other.

The mirror device includes at least one hinge for pivotally connecting the cover with the frame. Each hinge includes a sleeve formed on the cover, a sleeve formed on the frame and a pin inserted in the sleeves.

The mirror device includes first and second recesses defined in one of the cover and the frame and a protrusion formed on the other one of the cover and the frame. The protrusion can be selectively engaged with one of the first or second recess so the second mirror is in the extended or concealed position relative to the first mirror.

The grip/mirror combination includes a joint for connecting the auxiliary grip with the mirror device. The joint is connected with the auxiliary grip so that the joint can be rotated relative to the auxiliary grip about a first axis. The cover is connected with the joint so that the cover can be rotated relative to the joint about a second axis extending perpendicular to the first axis.

The auxiliary grip includes a number of teeth formed thereon and the joint includes a number of teeth formed thereon for engagement with the teeth of the auxiliary grip for retaining the joint in various positions relative to the auxiliary grip.

The cover includes a number of teeth formed thereon. The joint includes a number of teeth formed thereon for engagement with the teeth of the cover for retaining the cover in various positions with respect to the joint.

A bolt is inserted in a hole defined in the auxiliary grip and a hole defined in the joint, thus pivotally connecting the joint with the auxiliary grip.

The cover includes a stud formed thereon for insertion in a hole defined in the joint, thus pivotally connecting the cover with the joint.

The stud includes a neck of a reduced diameter. The joint consists of two halves each including a semi-circular edge so that when the halves are assembled, the semi-circular edges together form an annular portion for engagement with the neck.

The mirror device includes at least one hook for engagement with a portion of the auxiliary grip for retaining the mirror device in the auxiliary grip.

The auxiliary grip includes a clamp formed thereon for engagement with the bicycle handle. The clamp includes two jaws for clamping the bicycle handle. The clamp includes a threaded bolt in order to drive the jaws toward each other so as to firmly clamp the bicycle handle. Each of the jaws includes a hole defined therein for receiving the threaded bolt. A thread is formed on a wall around the hole defined in one of the jaws for engagement with the threaded bolt.

BRIEF DESCRIPTION OF DRAWINGS

The present invention is described in detail in relation to some embodiments thereof shown in the attached drawings wherein.

DETAILED DESCRIPTION OF PREFERRED EMBODIMENTS

Figure 1:
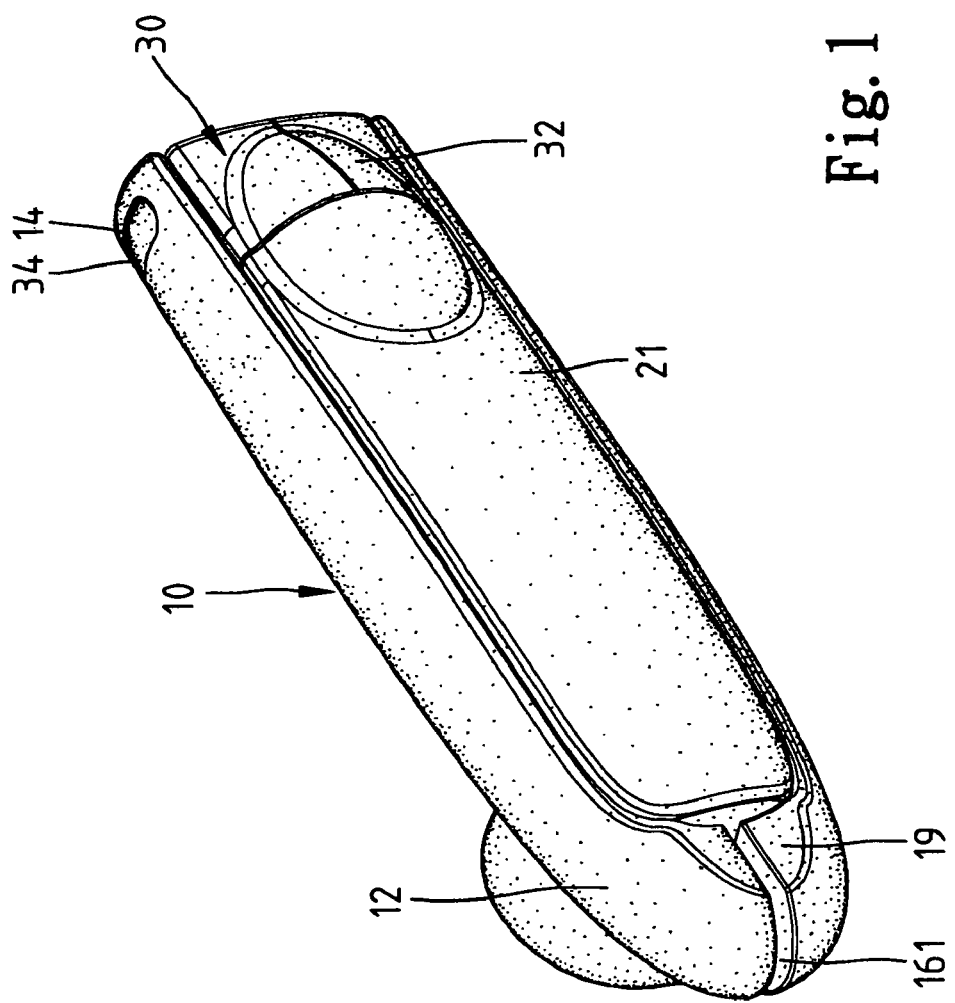
FIG. 1 is a perspective view of a grip/mirror combination according to the preferred embodiment of the present invention.
Figure 2:
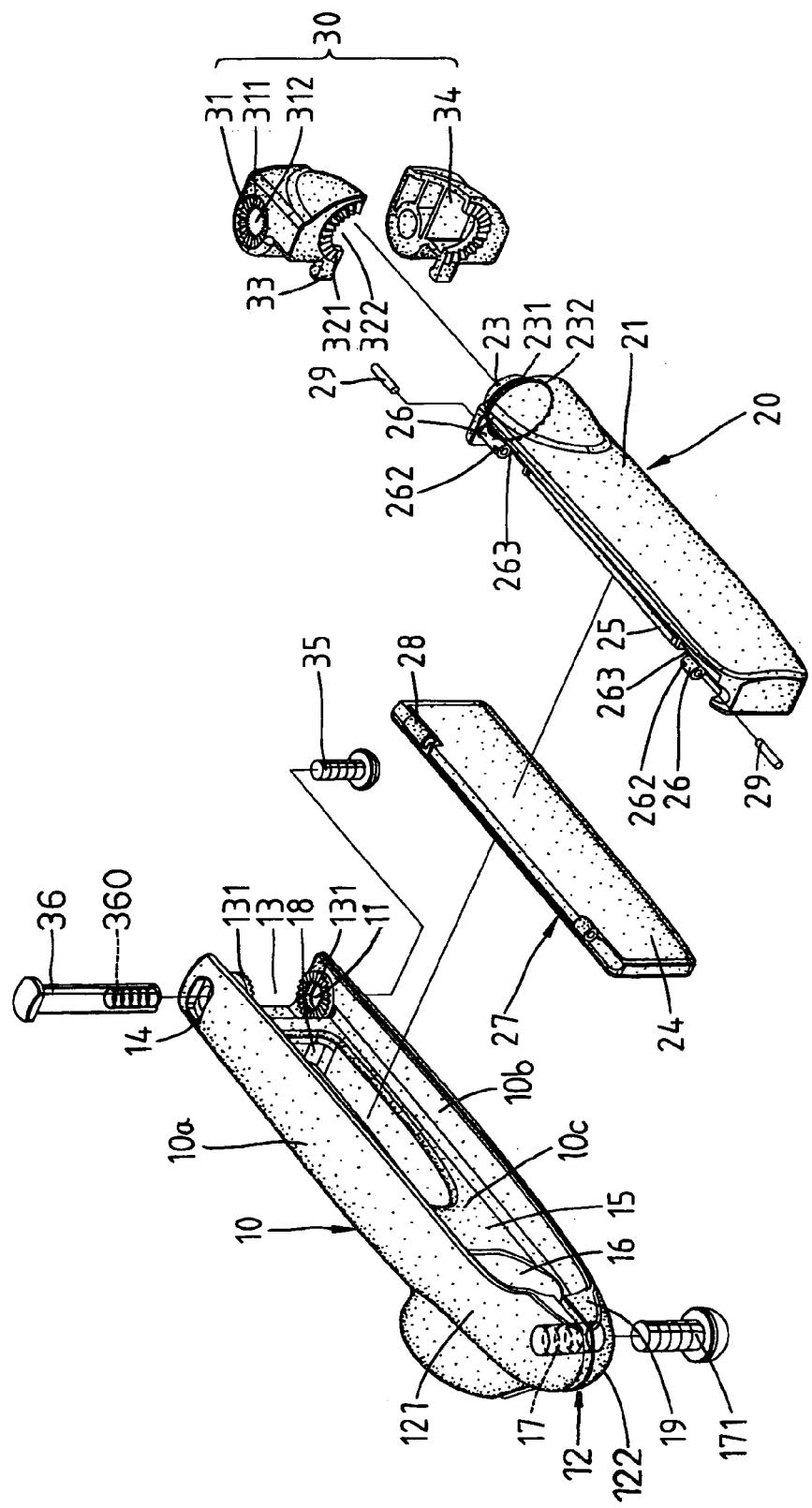
FIG. 2 is an exploded view of the grip/mirror combination of FIG. 1.
Figure 6:
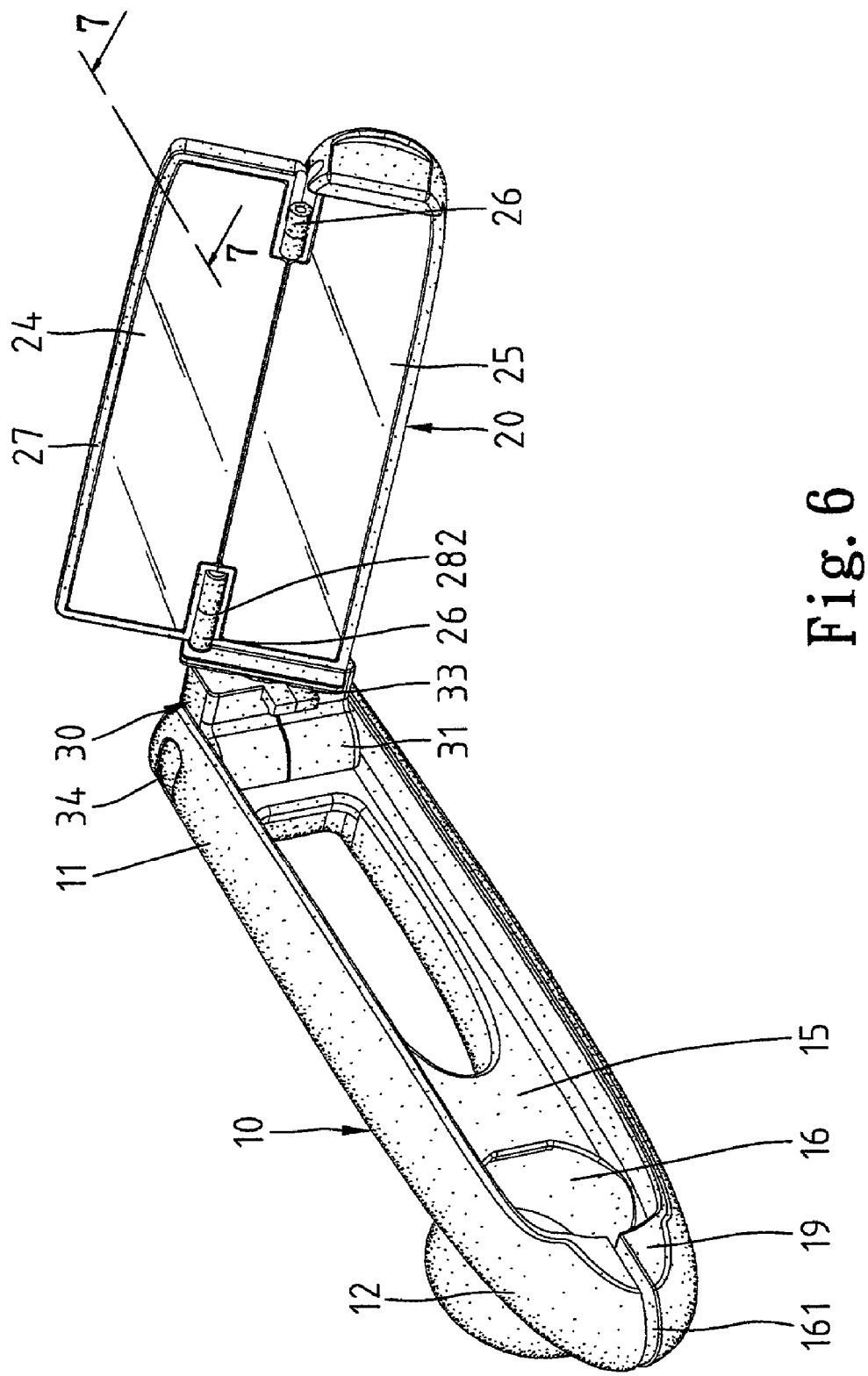
FIG. 6 is a perspective view of the grip/mirror combination of FIG. 1 in a third position.
Figure 7:
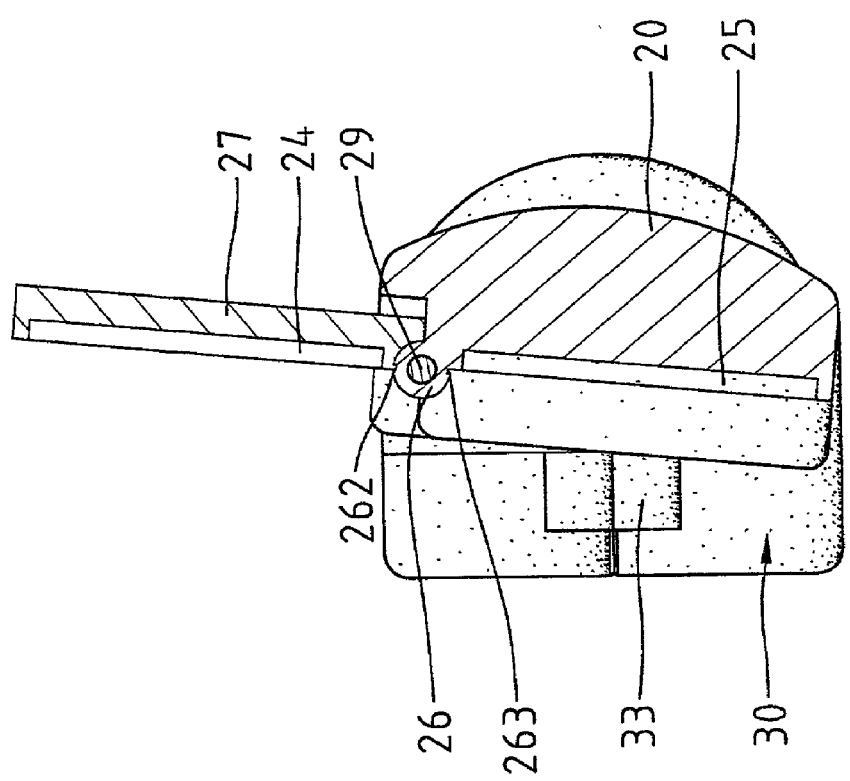
FIG. 7 is a cross-sectional view taken along a line 7—7 in FIG. 6.
Figure 8:
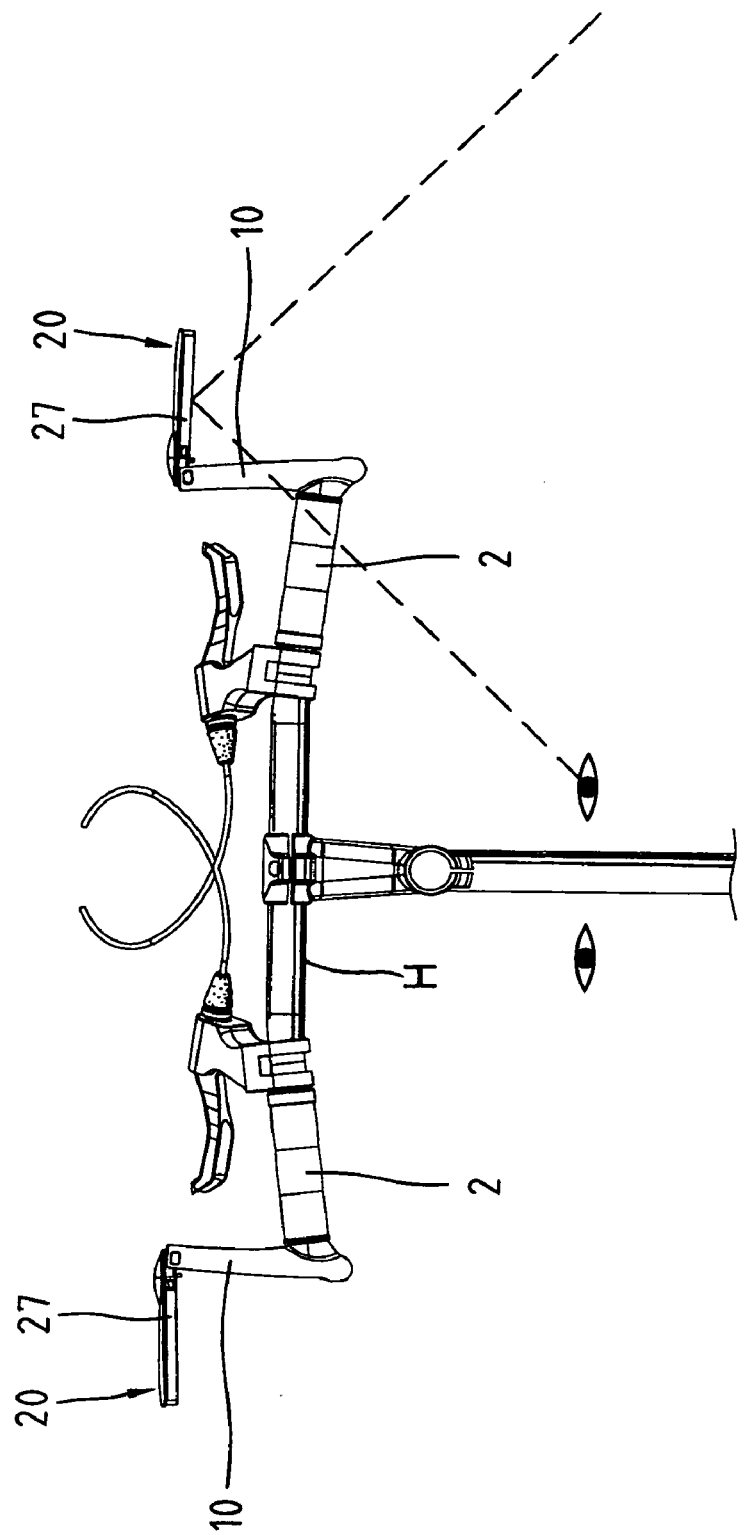
FIG. 8 is a top view of a bicycle equipped with two grip/mirror combinations in the second position shown in FIG. 6.

Referring to FIGS. 1 and 2, a grip/mirror combination 2 of the present invention namely consists of an auxiliary grip 10 and a mirror device 20 including two side view mirrors 24 and 25. Two auxiliary grips such as the auxiliary grip 10 can each be mounted on a free end of a bicycle handle H as shown in FIG. 8 so that a rider can hold the auxiliary grips while riding the bicycle. The side view mirrors 24 and 25 are connected with the auxiliary grip 10. While riding the bicycle, the rider can extend the side view mirrors 24 and 25 from the auxiliary grip 10 for providing a clear view of vehicles beside and behind him as shown in FIGS. 6 to 8. When the bicycle is parked, the side view mirrors 24 and 25 can be concealed in the auxiliary grip 10, thus protecting the side view minors 24 and 25 from being hit by any vehicle passing by it.

The side view mirror 24 is attached to a frame 27. Two separate sleeves 28 are formed at an edge of the frame 27. A cover 21 includes a terminal portion extending perpendicular thereto. A sleeve 26 projects from a side of the terminal portion of the cover 21. The sleeve 26 is close to an upper edge of the cover 21. Another sleeve 26 is formed at the upper edge of the cover 21. In an alternative embodiment, the sleeves 26 can both be formed at the upper edge of the cover 21. Further referring to FIG. 3, a pin 29 is inserted in each of the sleeves 26 and one of the sleeves 28, thus pivotally connecting the frame 27 with the cover 21.

Figure 4:
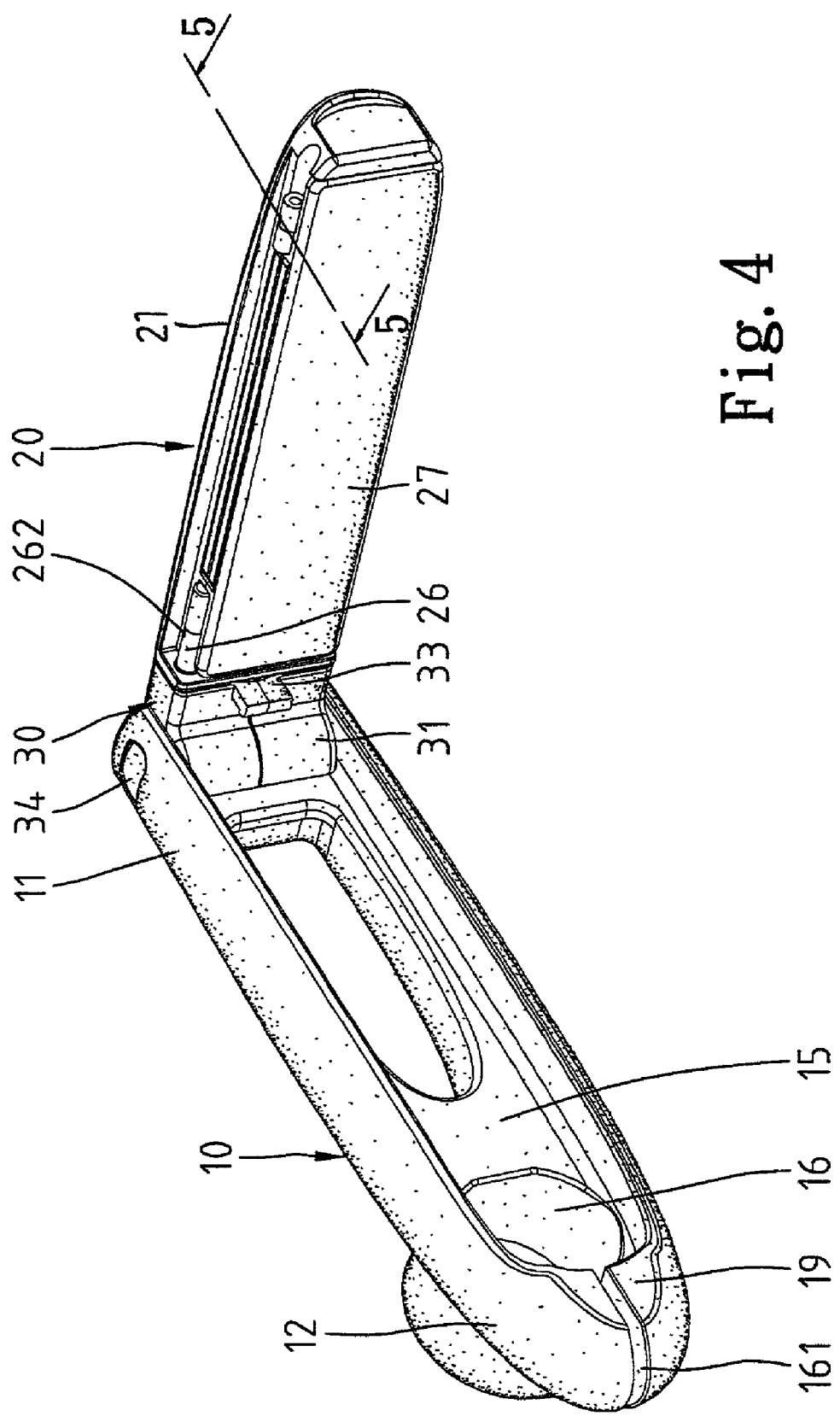
FIG. 4 is a perspective view of the grip/mirror combination of FIG. 1 in a second position.
Figure 5:
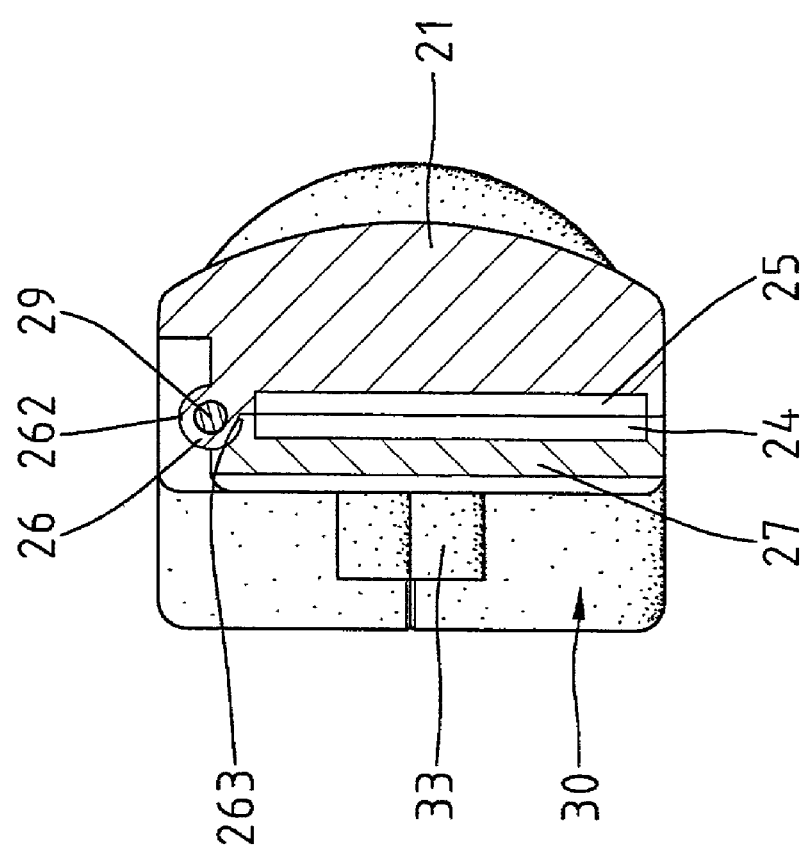
FIG. 5 is a cross-sectional view taken along a line 5—5 in FIG. 4.

Two protrusions 282 are formed at the same edge of the frame 27, each close to a sleeve 28. An upper recess 262 and a lower recess 263 are defined in an external surface of each of the sleeves 26. The protrusions 282 can be engaged with the lower recesses 263 for retaining the mirror 24 in a concealed position relative to the cover 21 as shown in FIGS. 4 and 5. The protrusions 282 can be engaged with the upper recesses 262 for retaining the mirror 24 in an extended position relative to the cover 21 as shown in FIGS. 6 and 7.

Figure 3:
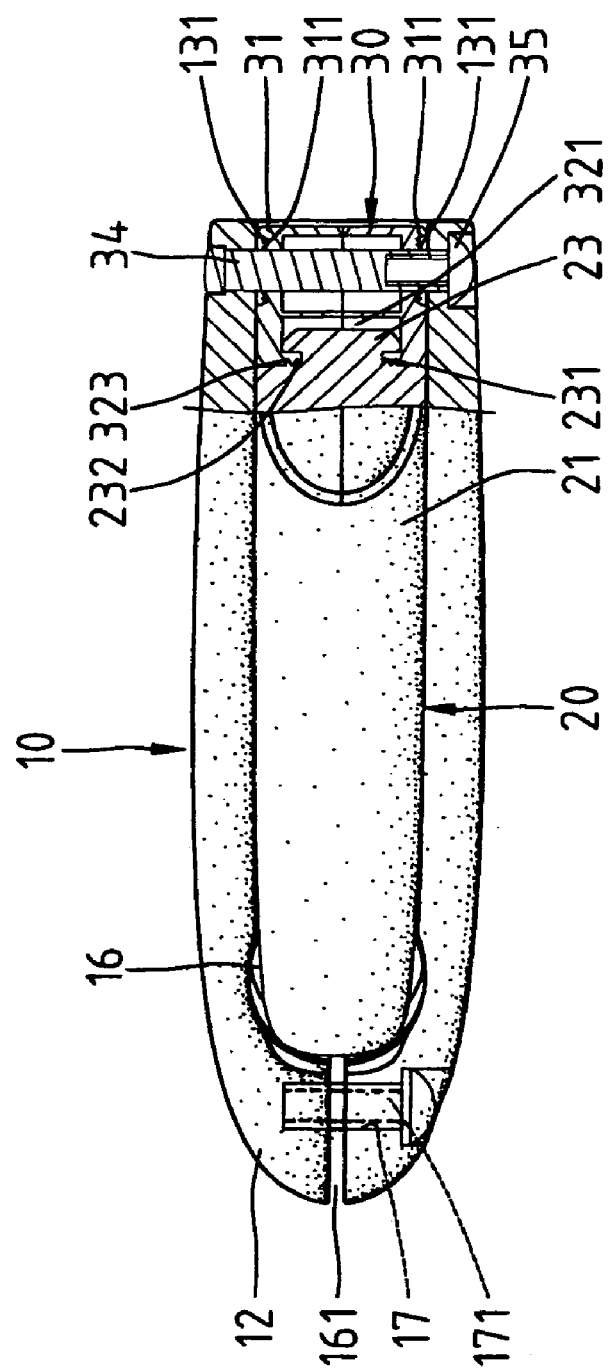
FIG. 3 is a front view of the grip/mirror combination of FIG. 1.

The cover 21 includes a stud 23 extended from a second side of the terminal portion thereof. The stud 23 includes a neck 231 of a smaller diameter as shown in FIG. 3. A number of teeth 232 are formed on the second side of the terminal portion of the cover 21 around the stud 23.

A joint 30 is used to connect the cover 21 with the auxiliary grip 10. The joint 30 consists of two halves 31, 32. Each half 31, 32 includes a first side portion and a second side portion extending perpendicular to the first side portion. A number of teeth 311 are formed on the first side portion of each half 31, 32. A hole 312 is defined in the first side portion of each half 31, 32 so that the teeth 311 are arranged around the hole 312. A number of teeth 321 are formed on the second side portion of each half 31, 32. Each half 31, 32 includes a semi-circular edge 322 formed on the second side portion thereof so that the teeth 321 are arranged along the semi-circular edge 322. Each half 31, 32 defines a space 34. At least one half 31, 32 includes a hook 33 formed thereon. As shown, each half 31, 32 includes a hook 33.

Referring to FIG. 3, the neck 231 is positioned between the semi-circular edges 322 so that the stud 23 is securely connected with the joint 30 when the halves 31, 32 are secured to each other in a maimer to be described. In this position, the teeth 232 are engaged with the teeth 321, thus rendering possible various positions of the cover 21 relative to the joint 30 as shown in FIGS. 5 and 7.

The auxiliary grip 10 includes upper and lower portions 10a and 10b connected with each other by an intermediate portion 10c. The upper, intermediate and lower portions 10a, 10b and 10c of the auxiliary grip 10 define a space 15 for receiving the mirror 24.

The auxiliary grip 10 includes a number of teeth 131 formed on an upper side of the lower portion 10b of the auxiliary grip 10 at a first end thereof. Similarly, the auxiliary grip 10 includes a number of teeth 131 formed on a lower side of the upper portion 10a thereof at the first end thereof. The teeth 311 of the joint 30 when received in a gap 13 between the teeth 131 can be engaged with the teeth 131 of the auxiliary grip 10 in order to provide various positions of the joint 30 relative to the auxiliary grip 10.

A hole 11 is defined in the first end of the lower portion 10a of the auxiliary grip 10 so that the teeth 131 are arranged around the hole 11. A counter-sink hole 14 is defined in the upper portion 10a of the auxiliary grip 10 so that the teeth 131 are arranged around the counter-sink hole 14. A bolt 36 includes an enlarged head (not numbered) formed at an end and a threaded hole 360 defined in a second end. The bolt 36 can be inserted through the counter-sink hole 14, the holes 312 and the hole 11. The head of the bolt 36 is received in the counter-sink hole 14. The head of the bolt 36 and the counter-sink hole 14 are shaped so as to prevent rotation of the bolt 36 relative to the auxiliary grip 10. A threaded bolt 35 can be brought into engagement with the threaded hole 360. The engagement of the bolt 36 with the threaded bolt 35 ensures firm interconnection of the auxiliary grip 10, the joint 30 and the cover 21.

A window 18 is defined in the intermediate portion 10c of the auxiliary grip 10 thus forming a frame around the window 18. The hooks 33 of the joint 30 can be brought into engagement with the frame of the window 18, thus retaining the mirrors 25 and 24 in the concealed position.

The auxiliary grip 10 includes a clamp 12 formed at a second end thereof. The clamp 12 includes an upper jaw 121 extending from the upper portion 10a of the auxiliary grip 10 and a lower jaw 122 extending from the lower portion 10b of the auxiliary grip 10 and separated from the upper jaw 121 by a space 161. The auxiliary grip 10 includes a hole 16 defined in the intermediate portion 10c thereof between the upper and lower jaws 121 and 122 of the clamp 12. A free end of the bicycle handle H can be inserted in the hole 16, thus, positioning it between the upper and lower jaws 121 and 122 of the clamp 12. A threaded hole 17 is defined in the upper jaw 121 of the clamp 12. As best seen in FIG. 3, a threaded bolt 171 is inserted through a hole defined in the lower jaw 122 of the clamp 12 and brought into engagement with the threaded hole 17, thus securing the auxiliary grip 10 to the free end of the bicycle handle H. A recess 19 is defined in the auxiliary grip 10 near the second end thereof for providing access to the second end of the cover 21.

To use the side view mirrors 24 and 25, the cover 21 is pivoted from the auxiliary grip 10 by an appropriate angle to a position as shown in FIG. 4. The cover 21 is retained in this position relative to the auxiliary grip 10 due to the engagement of the teeth 131 with the teeth 311. In this position, the side view mirrors 24 and 25 are positioned between the frame 27 and the cover 21 as further shown in FIG. 5. The side view mirror 24 attached to the frame 27 is retained in this position relative to the side view mirror 25 attached to the cover 21 due to the engagement of the protrusions 282 with the lower recesses 263.

Then, the side view mirror 24 secured to the frame 27 is pivoted from the side view mirror 25 attached to the cover 21 so that they are substantially positioned in a same plane as shown in FIGS. 6 and 7. The side view mirror 24 is retained in this position relative to the side view mirror 25 due to the engagement of the protrusions 282 with the upper recesses 262.

Furthermore, the rider can pivot the cover 21 relative to the auxiliary grip 10 so as to move the side view mirrors 24 and 25 to an appropriate position in order to provide a clear view of vehicles beside and behind hint The cover 21 is retained in this position relative to the auxiliary grip 10 due to the engagement of the teeth 232 with the teeth 321.

Figure 9:
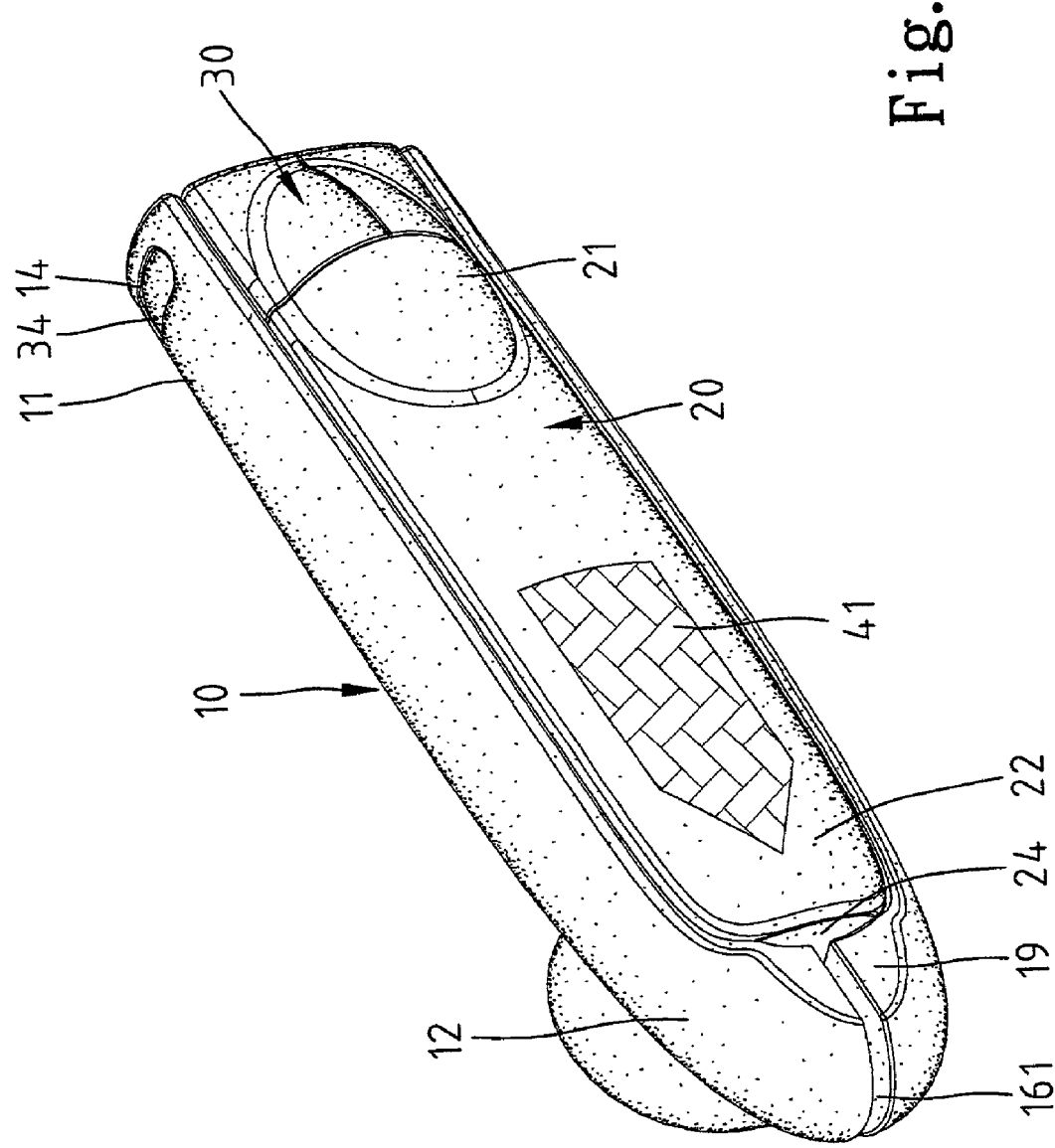
FIG. 9 is a perspective view of a grip/mirror combination of FIG. 1 equipped with a reflective strip.

Referring to FIG. 9, a reflective strip 41 is attached to the outer surface 22 of the cover 21 opposite to the side view mirror 25. The reflective strip 41 is used to reflect light emitted from the headlight of a vehicle to help a driver in the vehicle be aware of the rider.

Figure 10:
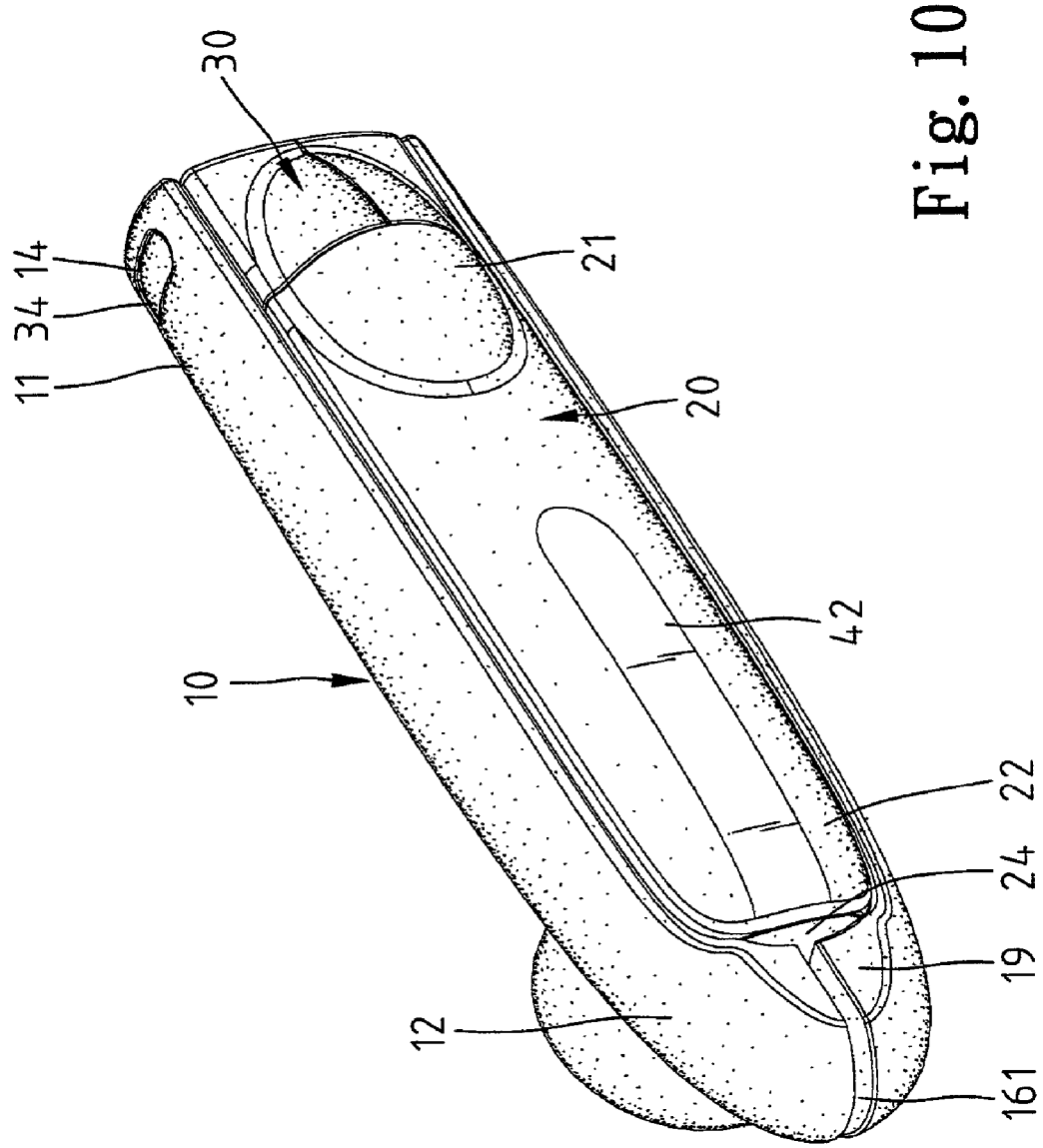
FIG. 10 is a perspective view of a grip/mirror combination of FIG. 1 equipped with a light emitter.

Referring to FIG. 10, a light emitter 42 is mounted on the outer surface 22 of the cover 21 opposite to the side view mirror 25. The reflective strip 41 is replaced with the light emitter 42 that is used to emit light to help people be aware of the rider.

Figure 11:
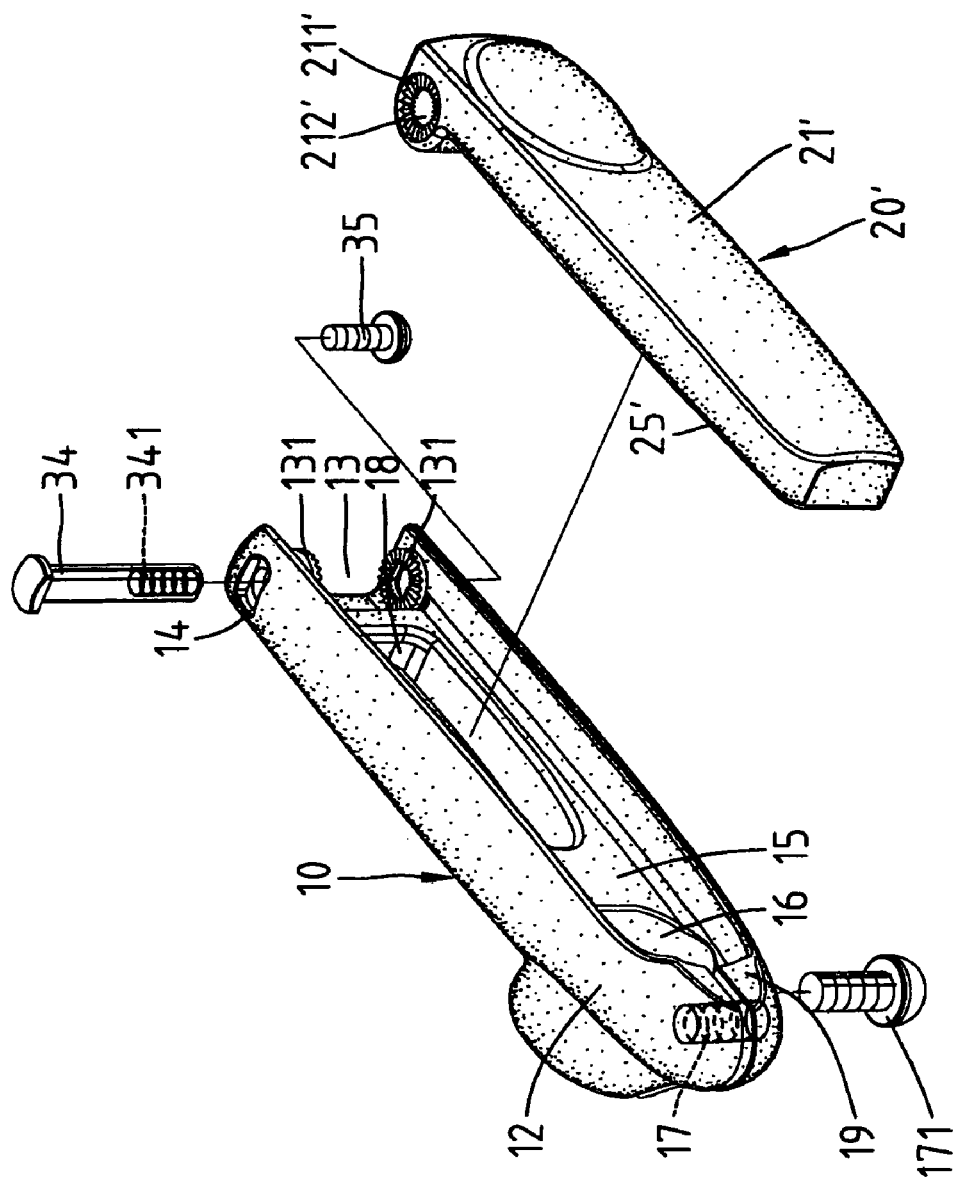
FIG. 11 is a perspective view of a grip/mirror combination according to a second embodiment of the present invention.
Figure 12:
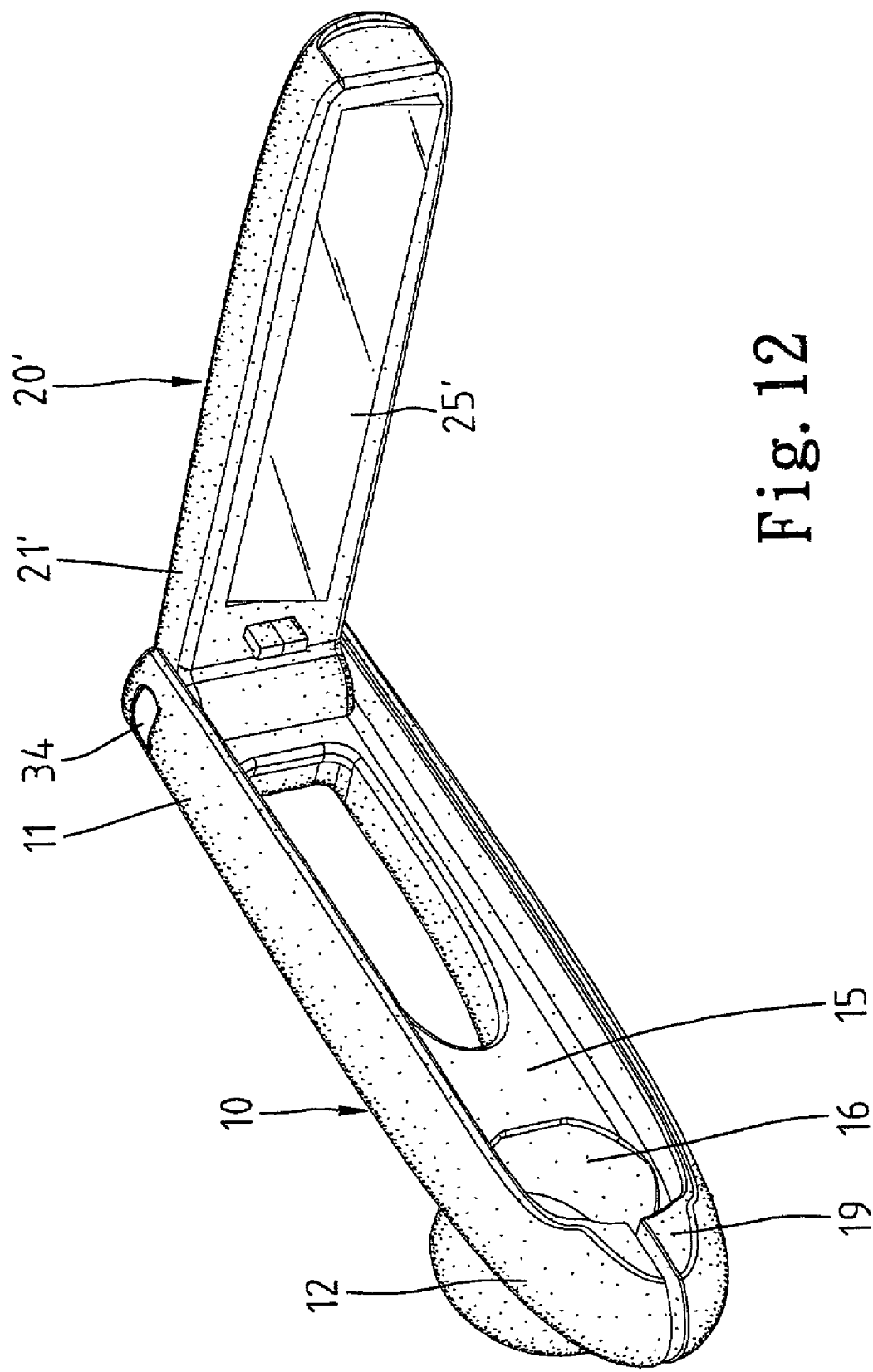
FIG. 12 is an exploded view of the grip/mirror combination of FIG. 11.
Figure 13:
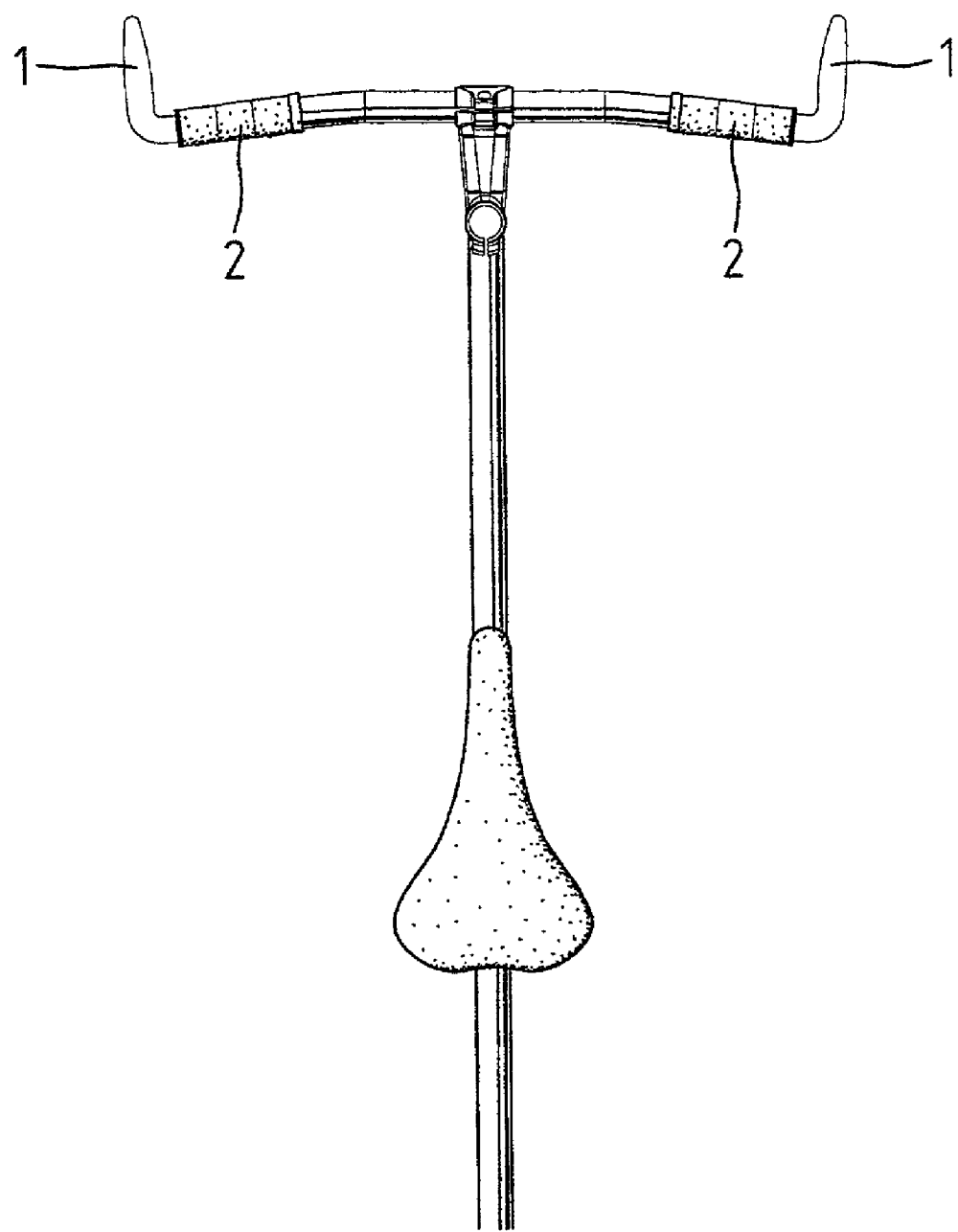
FIG. 13 is a top view of a bicycle equipped with two conventional auxiliary grips.
Figure 14:
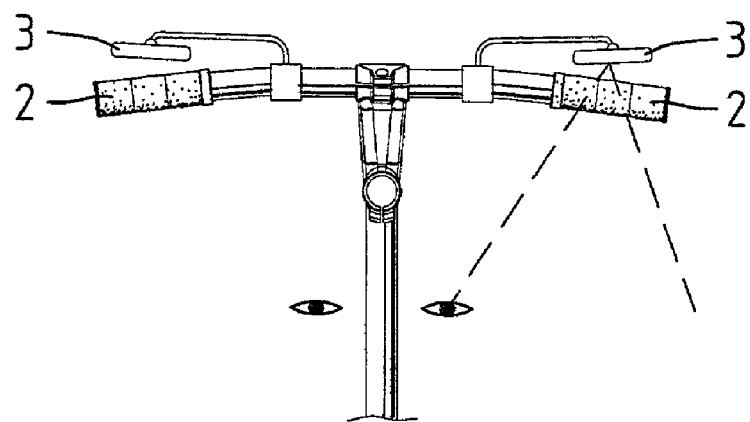
FIG. 14 is a top view of a bicycle equipped with two side view mirrors of a first conventional type.
Figure 15:
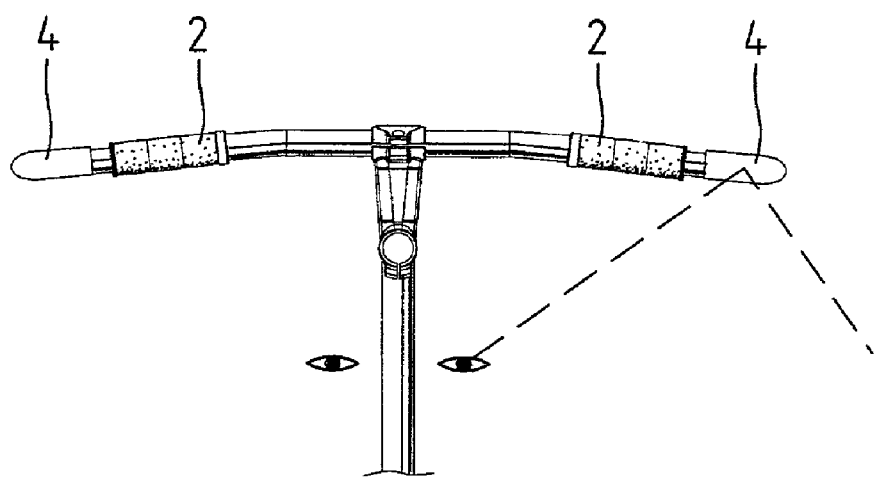
FIG. 15 is a top view of a bicycle equipped with two side view mirrors of a second conventional type.

FIGS. 11 and 12 show a grip/minor combination of a second embodiment of this invention consisting of an auxiliary grip 10 and a mirror device 20'. The auxiliary grip 10 is identical to that is shown in FIGS. 1 to 10 and, therefore, will not be described in farther detail. The mirror device 20' includes a cover 21' on which only one side view mirror 25' is pivotally mounted. The cover 21' includes, near an end, a number of teeth 211' formed on an upper portion at and a number of teeth 211' formed on a lower portion. A hole 212' is defined in the cover 21' so tat the teeth 211' are arranged around the hole 212'. The mirror device 20' is received in the auxiliary grip 10 so that the teeth 211' are engaged with the teeth 131 for providing various positions of the mirror device 20' relative to the auxiliary grip 10. A bolt 36 and a threaded bolt 35 are used to securely connect the mirror device 20' with the auxiliary grip 10.

A number of embodiments of the present invention have been described for purposes of illustration. Those skilled in the art can derive a lot of variations from these embodiments after a study of this patent specification. Therefore, these embodiments shall by no means limit the scope of the present invention. The scope of the present invention can only be defined in claims attached to and taken as a portion of this patent specification.

The invention claimed is:

1. A grip/mirror combination including an auxiliary grip, with the auxiliary grip having a first end and a second end, with the first end and the second end being spaced and defining a grip axis, with the first end including a clamp formed thereon for slideable receipt of a bicycle handle at a first nonparallel angle to the grip axis; a mirror device connected to the second end of the auxiliary grip and moveable between a first position and a second position; and a joint for connecting the auxiliary grip with the mirror device, with the auxiliary grip including an upper portion and a lower portion, with the joint located intermediate the upper and lower portions, with a bolt extending through the upper and lower portions and the joint and defining a first joint axis, with the mirror device in the second position extended from the auxiliary grip and the grip axis at a second non-parallel angle, with the mirror device received in the auxiliary grip intermediate the first end and the second end in the first position, wherein when the mirror device is received in the auxiliary grip in the first position, the auxiliary grip is used by grasping by fingers of a bicyclist's hand generally concentrically around the grip axis and intermediate the clamp and the second end to facilitate manipulation by the bicyclist's hand on the auxiliary grip, and when the mirror device is in the second position, the auxiliary grip is used by grasping by the fingers of the bicyclist's hand generally concentrically around the grip axis and intermediate the clamp and the second end to facilitate manipulation by the bicyclist's hand on the auxiliary grip, with the mirror device including a cover pivotally connected with the auxiliary grip, with the mirror device including a first mirror mounted on the cover, wherein the cover is pivotally connected with the joint about a second joint axis perpendicular to the first joint axis so that the cover can be rotated relative to the joint in a dimension different than rotation of the joint about the first joint axis relative to the auxiliary grip.

2. The grip/mirror combination according to claim 1 wherein the clamp slideably receives the bicycle handle perpendicular to the grip axis, and the grip axis extends in a direction of forward movement of the bicycle.

3. The grip/mirror combination according to claim 1 wherein the auxiliary grip includes a window, with the mirror device received in the auxiliary grip extending over the window; and wherein the mirror device includes at least one hook for engagement with the window of the auxiliary grip for retaining the mirror device in the auxiliary grip.

4. A grip/mirror combination including an auxiliary grip adapted to be secured to a bicycle handle and a mirror device connected with the auxiliary grip, so that the mirror device can be extended from the auxiliary grip when in use and received in the auxiliary grip when not in use, with the mirror device including a cover pivotally connected with the auxiliary grip, with the mirror device including a first mirror mounted on the cover, wherein the mirror device includes a frame connected with the cover and a second mirror mounted on the frame, so that the second mirror can be pivoted relative to the first mirror between an extended position where the first and second mirrors are substantially in a same plane and a concealed position where the first and second mirrors face each other.

5. The grip/mirror combination according to claim 4 wherein the mirror device includes at least one hinge for pivotally connecting the cover with the frame.

6. The grip/mirror combination according to claim 5 wherein the at least one hinge includes a first sleeve formed on the cover, a second sleeve formed on the frame and a pin inserted in the first and second sleeves.

7. The grip/mirror combination according to claim 6 wherein the mirror device includes a recess defined in an external surface of the first sleeve of the cover and a protrusion formed on the second sleeve of the frame, and the recess can be engaged with the protrusion in order to retain the second mirror in the extended position relative to the first mirror.

8. The grip/mirror combination according to claim 6 wherein the mirror device includes a recess defined in an external surface of the first sleeve of the cover and a protrusion formed on the second sleeve of the frame, and the recess can be engaged with the protrusion in order to retain the second mirror in the concealed position relative to the first mirror.

9. The grip/mirror combination according to claim 4 wherein the mirror device includes a recess defined in one of the cover and the frame and a protrusion formed on the other one of the cover and the frame, and the recess can be engaged with the protrusion in order to retain the second mirror in the extended position relative to the first mirror.

10. The grip/mirror combination according to claim 9 wherein the recess is defined in the cover and the protrusion is formed on the frame.

11. The grip/mirror combination according to claim 4 wherein the mirror device includes a recess defined in one of the cover and the frame and a protrusion formed on the other one of the cover and the frame, and the recess can be engaged with the protrusion in order to retain the second mirror in the concealed position relative to the first mirror.

12. The grip/mirror combination according to claim 11 wherein the recess is defined in the cover and the protrusion is formed on the frame.

13. A grip/mirror combination including an auxiliary grip adapted to be secured to a bicycle handle; a mirror device connected with the auxiliary grip so that the mirror device can be extended from the auxiliary grip when in use and received in the auxiliary grip when not in use; and a joint for connecting the auxiliary grip with the mirror device, with the joint connected with the auxiliary grip so that the joint can be rotated relative to the auxiliary grip, wherein the auxiliary grip includes a number of teeth formed thereon and the joint includes a number of teeth formed thereon for engagement with the teeth of the auxiliary grip for retaining the joint in various positions relative to the auxiliary grip.

14. The grip/mirror combination according to claim 13 including a bolt inserted in a hole defined in the auxiliary grip and a hole defined in the joint, thus pivotally connecting the joint with the auxiliary grip.

15. A grip/mirror combination including an auxiliary grip adapted to be secured to a bicycle handle; a mirror device connected with the auxiliary grip so that the mirror device can be extended from the auxiliary grip when in use and received in the auxiliary grip when not in use; and a joint for connecting the auxiliary grip with the mirror device, wherein the joint is connected with the auxiliary grip so that the joint can be rotated relative to the auxiliary grip, with the mirror device having a cover, wherein the cover is connected with the joint so that the cover can be rotated relative to the joint, wherein the cover includes a number of teeth formed thereon and the joint includes a number of teeth formed thereon for engagement with the teeth of the cover for retaining the cover in various positions with respect to the joint.

16. The grip/mirror combination according to claim 15 wherein the cover includes a stud formed thereon for insertion in a hole defined in the joint, thus pivotally connecting the cover with the joint.

17. The grip/mirror combination according to claim 16 wherein the stud includes a neck of a reduced diameter, and the joint consists of two halves each including a semi-circular edge so that when the halves are assembled, the semi-circular edges together form an annular portion for engagement with the neck.

18. A grip/mirror combination including an auxiliary grip, with the auxiliary grip having a first end and a second end, with the first end and the second end being spaced and defining a grip axis, with the first end including a clamp formed thereon for slideable receipt of a bicycle handle at a nonparallel angle to the grip axis; and a mirror device connected to the second end of the auxiliary grip so that the mirror device extended from the auxiliary grip when in use and so that the mirror device is received in the auxiliary grip intermediate the first end and the second end when not in use, wherein when the mirror device is received in the auxiliary grip, the auxiliary grip is used by grasping by fingers of a bicyclist's hand generally concentrically around the grip axis and intermediate the clamp and the second end to facilitate manipulation by the bicyclist's hand on the auxiliary grip, with the auxiliary grip when the mirror device is extended being used by grasping by the fingers of the bicyclist's hand generally concentrically around the grip axis and intermediate the clamp and the second end to facilitate manipulation by the bicyclist's hand on the auxiliary grip, wherein the clamp includes two jaws for clamping the bicycle handle and a bolt inserted into holes defined in the two jaws.

19. A grip/mirror combination including an auxiliary grip adapted to be secured to a bicycle handle; and a mirror device connected with the auxiliary grip so that the mirror device can be extended from the auxiliary grip when in use and received in the auxiliary grip when not in use, wherein the auxiliary grip includes a clamp formed thereon for engagement with the bicycle handle, wherein the clamp includes two jaws for clamping the bicycle handle and a threaded bolt in order to drive the two jaws toward each other so as to firmly clamp the bicycle handle.

20. The grip/mirror combination according to claim 19 wherein each of the two jaws includes a hole defined therein for receiving the threaded bolt.

21. The grip/mirror combination according to claim 20 wherein the hole defined in one of the jaws is a threaded hole for engagement with the threaded bolt.

* * * * *